United States Patent
Campbell, Jr.

(10) Patent No.: US 6,666,942 B2
(45) Date of Patent: *Dec. 23, 2003

(54) METHOD FOR MANUFACTURING COMPOSITE PARTS

(75) Inventor: James H. Campbell, Jr., Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/166,546

(22) Filed: Jun. 10, 2002

(65) Prior Publication Data

US 2002/0148553 A1 Oct. 17, 2002

Related U.S. Application Data

(63) Continuation of application No. 09/591,352, filed on Jun. 9, 2000, now Pat. No. 6,406,580.

(51) Int. Cl.[7] .................... B29C 35/00; B29D 7/00; B29L 59/00
(52) U.S. Cl. ................ 156/182; 156/165; 156/184; 156/189; 264/159; 264/160; 264/163
(58) Field of Search .................. 156/182, 193, 156/194, 256, 65, 165, 184, 196, 211, 219, 189; 264/159, 160, 163, 322, 505, 506; 425/194, 471, 393; 52/745.19

(56) References Cited

U.S. PATENT DOCUMENTS

| | | | | |
|---|---|---|---|---|
| 3,962,393 A | * | 6/1976 | Blad | 264/571 |
| 4,351,688 A | | 9/1982 | Weiss et al. | 156/358 |
| 4,909,880 A | | 3/1990 | Kittelson et al. | 156/189 |
| 4,946,538 A | | 8/1990 | Bendarzewski et al. | 156/361 |
| 5,106,568 A | * | 4/1992 | Honka | 264/510 |
| 5,213,646 A | | 5/1993 | Zsolnay et al. | 156/166 |
| 5,374,388 A | | 12/1994 | Frailey | 264/510 |
| 5,403,537 A | * | 4/1995 | Seal et al. | 264/511 |
| 5,707,576 A | * | 1/1998 | Asher | 264/258 |
| 5,795,094 A | | 8/1998 | McKague, Jr. et al. | 403/335 |
| 5,954,898 A | | 9/1999 | McKague, Jr. et al. | 156/64 |
| 6,149,851 A | * | 11/2000 | Deckers et al. | 264/219 |

* cited by examiner

Primary Examiner—Richard Crispino
Assistant Examiner—Sue A. Purvis
(74) Attorney, Agent, or Firm—Bracewell & Patterson, L.L.P.

(57) ABSTRACT

A method for manufacturing composite parts includes positioning a plurality of composite layers on an application surface formed by a plurality of tooling members and filler members on a mandrel. A part formation aid is disposed on the composite layers above each tooling member. The filler members are then removed, and the composite layers slit over the recesses. The mandrel, the tooling members, the composite layers, and the part formation aids are placed in a vacuum bag. As the bag is evacuated, each part formation aid forces the side edge of the composite layers formed by the slit around the respective tooling member, thereby forming a composite part with a desired shape, thickness, and density. In an alternate embodiment, a flanged composite panel is formed around a rectangular mandrel after positioning composite layers on an outer surface of the mandrel and an outer surface of a filler member disposed on one end of the mandrel. After removing the filler member, the flanged panel is formed and partially cured by vacuum bagging. A plurality of tooling members and filler members are then placed on the flanged panel to form an application surface. Composite layers are positioned on the application surface, and then the filler members are removed. Vacuum bagging is used to produce a plurality of stiffeners around the tooling members and directly adjacent to the flanged panel. The stiffeners and flanged panel are co-cured to produce a single and integral part.

15 Claims, 5 Drawing Sheets

METHOD FOR MANUFACTURING COMPOSITE PARTS

This application is a continuation of application Ser. No. 09/591,352, filed Jun. 9, 2000, now U.S. Pat. No. 6,406,580, entitled "Method for Manufacturing Composite Parts".

BACKGROUND OF THE INVENTION

1. Field of the Invention

This invention relates in general to a method of manufacturing composites and in particular to a method for manufacturing composite panels and stiffeners by first preparing a circumferential array of material and then forming and curing the material to the desired shape.

2. Description of Related Art

Composite structures and parts are necessary parts for industries requiring high strength, lightweight materials. A good example of this is in the aerospace industry, where aircraft and other airborne vehicles require high strength components that weigh as little as possible.

Many approaches have been previously developed for forming multiple layers of composite material into a desired shape or shapes. The most common, particularly in the aircraft industry, involves placing individual layers of material onto a form having a desired shape, and then curing the layers. Curing the material through application of heat and pressure fully compacts or debulks the composite material. The cured composite material then has the desired shape and strength. Forming parts in this way does not involve significant reshaping of the composite material during curing and may be very time consuming.

Disadvantages inherent in the aforementioned process include the very tedious and time consuming operation of laying individual layers of composite material directly onto a tool to obtain a final non-flat desired shape. The very labor intensive process of placing the layers of material onto a form may require many highly-skilled man-hours for each part, and is, therefore, very expensive. Additionally, the aforementioned process may require stopping after placement of every few layers of material and providing some form of mechanical compaction to the material. This may be necessary to achieve final full compaction of the layers. Failure to achieve full compaction of the material layers prior to curing may result in wrinkles and other anomalies in the final structure, since as individual layers compact, the local path-lengths of the fibers in the layers change. Wrinkles and other anomalies in the cured structure are aesthetically and structurally undesirable.

Previously developed methods for forming composite parts also fail to assure uniformity between parts. In many prior art methods, each part is separately made. Each part is formed by the process of placing individual layers onto a form and then curing the layers while on the form. The cured part is removed from the form, allowing the next part to be made by the same process. By this method a number of parts can be formed. Unfortunately, variations in compaction, in resin bleeding from the part, and in fiber "washing" or dislocations from resin bleeding, tend to occur because compaction is occurring three dimensionally, and because of the low viscosity of the resin. These factors may yield parts that lack uniformity. Previously developed methods for building composite parts are, therefore, not compatible with low-cost, high-volume manufacturing methodologies.

Composite parts fabricated by previously developed methods often require machining after curing, e.g. routing, grinding, etc., in order to meet final dimension requirements. This machining adds additional time and expense to the process of fabricating the part and can result in damage to the part by delamination of the cured layers.

Yet another disadvantage of the previously developed methods for fabricating composite parts is their incompatibility with in-process control (IPC), statistical process control (SPC), and total quality (TQ) methodologies. IPC, SPC, and TQ require repeatable, measurable results to obtain full effectiveness. The custom approach of the prior art to fabricating composite parts is not amenable to obtaining the benefits of IPC, SPC, and TQ, i.e., high quality, high yield, and low cost.

Previously developed methods for forming composite parts often do not provide acceptable results when forming complex parts from two or more sub-parts or pre-forms by "co-curing". In co-curing, two or more sub-parts are made into a single part by placing the sub-parts in the desired orientation and curing the combination. Since the prior art requires the individual layers of a sub-part to be laid-up in their final shape on a form joining two or more individual sub-parts to make a part, e.g., two channels and two plates to form an I-beam, is very difficult. If a foreign material, e.g., backing paper or tape, is accidentally trapped between the layers during layup of a part, there is little likelihood that it will be detected. As a result, high labor costs may be invested in a complex, co-cured part that must be scrapped due to the inclusion.

Prior methods for fabricating composite parts often require that the individual composite layers be stored in a freezer prior to layup. This adds additional handling and equipment costs in fabricating a composite part.

Therefore a need has arisen for an improved method and system for fabricating parts from composite materials.

A need further exists for an improved method and system for reducing the time necessary for fabricating composite parts.

A further need exists for a low-cost method and system for fabricating parts from composite materials.

Yet another need exists for a method and system for fabricating multiple uniform parts from composite materials that do not require significant amounts of machining after curing.

Another need exists for a method for fabricating composite parts compatible with IPC, SPC, and TQ.

Yet another need exists for a method and system for fabricating composite parts that eliminate the need for special handling and storage of composite layers.

BRIEF SUMMARY OF THE INVENTION

The present invention provides a method for manufacturing a composite part having a specified shape, thickness, and density. The composite part is formed in an array of similar parts located around a mandrel having an outer surface and a longitudinal axis. Several tooling members are disposed around the outer surface of the mandrel, the tooling members serving as the molds around which the composite parts will be formed. A plurality of filler members are disposed on the outer surface of the mandrel between the tooling members. An outer surface of each tooling member and an outer surface of each filler member combine to form a generally smooth and rounded application surface that surrounds the mandrel.

A plurality of composite layers is positioned on the application surface using an automated positioning technique such as fiber placement. A part formation aid is placed on the composite layers above each tooling member, and a cut is made in the composite layers parallel to the longitudinal axis of the mandrel and between each tooling member. The filler members are then removed from between the tooling members.

Finally, the mandrel and composite layers are placed in a vacuum bag, which is then placed in an autoclave. The vacuum bag is an elastomeric material in the form of a tube that is slid over the mandrel. The vacuum bag tube can be pulled out of the way during fiber placement and slid over the mandrel at the time of forming. As the bag is evacuated, each part formation aid deforms toward the mandrel, thereby forming the composite layers around the tooling members. The composite part resulting from the evacuation of the bag is then cured for a specified amount of time to insure that the composite part will maintain its specified shape, thickness, and density.

Alternatively, the method according to the present invention is used to fabricate composite parts having more than one component. One application of this method is to produce a flanged panel having a plurality of hat-shaped stiffeners integrally disposed on the panel.

The flanged panel is produced using a rectangular mandrel having an outer surface. A filler member having an outer surface is placed on one end of the mandrel, the outer surface of the filler member and the outer surface of the mandrel forming a generally smooth and rounded application surface.

A plurality of composite layers is positioned on the application surface using an automated positioning method such as fiber placement. After placement of the layers, the filler member is removed, and the composite layers are subjected to the vacuum bagging technique previously mentioned. This process forms a flanged composite panel. The panel is then partially cured.

After partial curing, a plurality of tooling members are disposed on an outer surface of the recently formed panel. Filler members are placed on the outer surface of the panel between the tooling members to form a generally smooth second application surface. Composite layers are applied to the second application surface using fiber placement. The filler members are then removed and the composite layers are cut between the tooling members.

The flanged panel, the tooling members, and the newly applied composite layers are placed in a vacuum bag. As the bag is evacuated, the composite layers form into hat-shaped stiffeners around the tooling members. The flanged panels and the stiffeners are finally co-cured or co-bonded to form an integral composite part.

DETAILED DESCRIPTION OF THE PREFERRED EMBODIMENT

Figure 2:
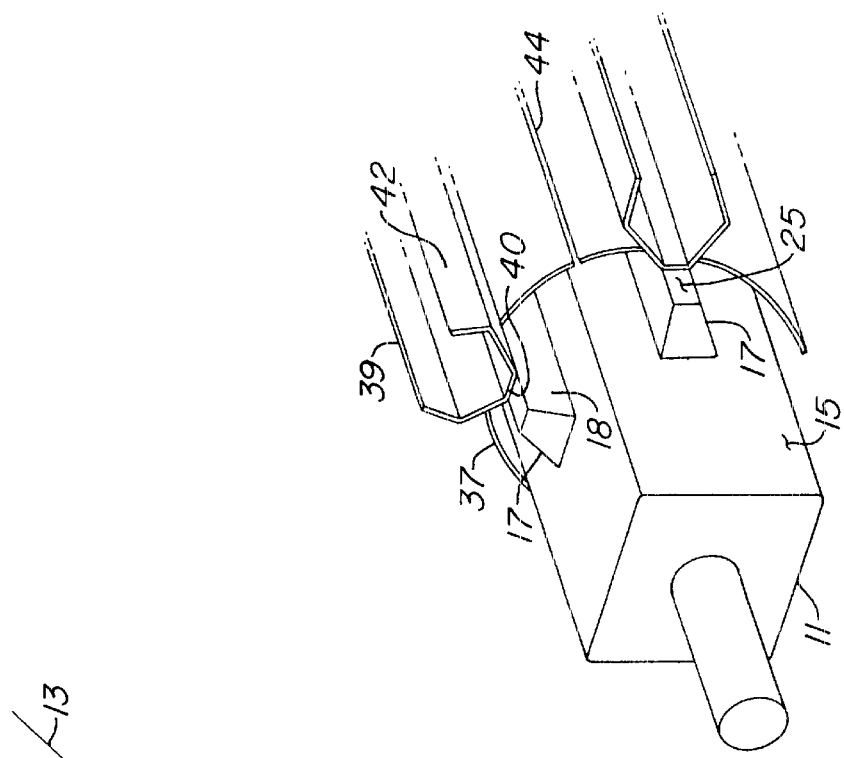
FIG. 2 is a perspective view showing the mandrel, tooling members, and composite layers of FIG. 1 with a part formation aid located above each tooling member.
Figure 1:
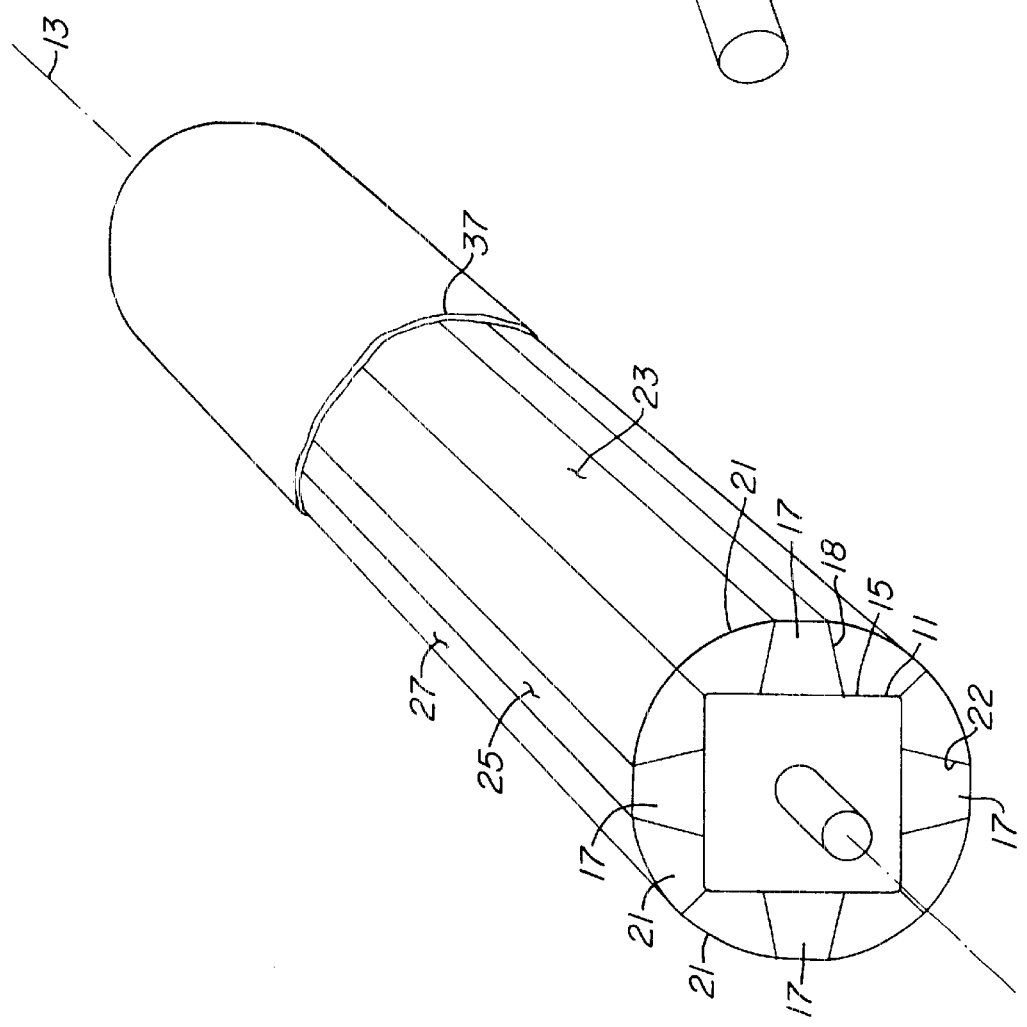
FIG. 1 is a partially cut-away perspective view showing a plurality of composite layers positioned around a mandrel, tooling members, and filler members according to the present invention.
Figure 3:
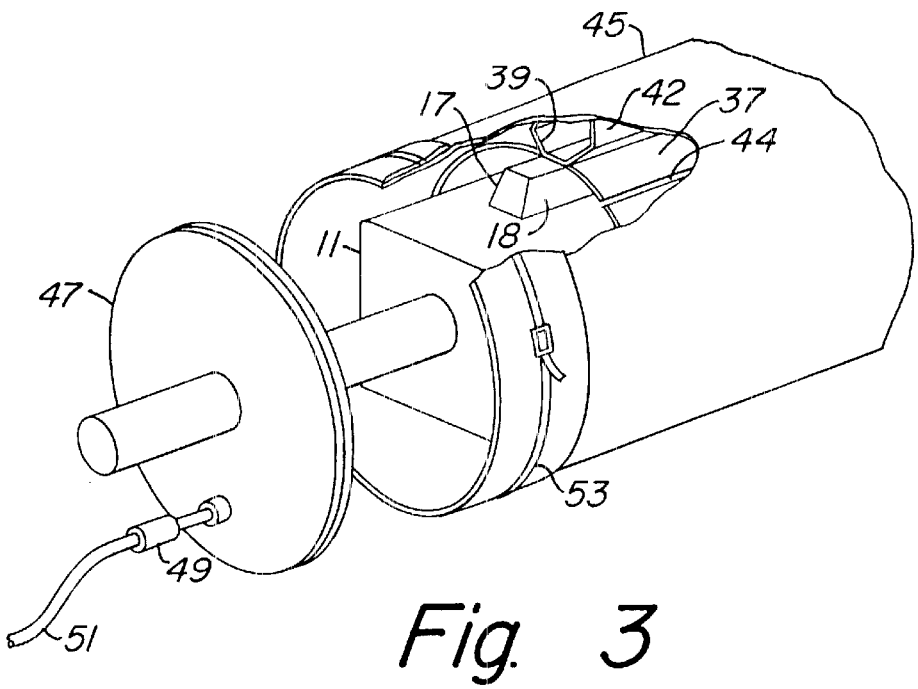
FIG. 3 is a partially cut-away perspective view of the mandrel and tooling members of FIG. 1 shown installed in a vacuum bag, the vacuum bag being held to the inside of a hard outer tube.

Referring to FIGS. 1, 2, and 3 in the drawings, a method of manufacturing composite parts according to the present invention is illustrated. A mandrel 11 having a longitudinal axis 13 and an outer surface 15 provides a support base for producing the composite parts according to the present invention. In this embodiment, mandrel 11 is square in cross section, having four flat sides on its outer surface 15. A plurality of tooling members 17 are disposed on outer surface 15 of mandrel 11. Tooling members 17 generally have a longitudinal axis that is positioned parallel to longitudinal axis 13 when tooling members 17 are attached to mandrel 11. Although tooling members 17 are generally made of rubber and are mechanically fastened to mandrel 11, it is conceivable that tooling members 17 could be an integral part of mandrel 11. In cross-section, each tooling member is a trapezoid in this embodiment, having sidewalls 18 that converge toward each other and an outer surface 25 that is a portion of a cylinder.

After installation of tooling members 17, filler members 21 are placed between tooling members 17 and against outer surface 15 of mandrel 11. Depending on the spacing between tooling members 17 and the cross-sectional shape of mandrel 11, more than one filler member 21 may be required in the space between tooling members 17. In FIG. 1, two filler members 21 are placed in each space between tooling members 17. Each filler member 21 has a sidewall 22 that diverges from outer surface 15 and abuts one of the sidewalls 18. Each filler member 21 has an outer surface 27 that is a portion of a cylinder.

Filler members 21 are used in conjunction with tooling members 17 to provide a smooth application surface 23. Typically, filler members 21 are made of tooling foam, which is easily moldable or shapable into application surface 23. Tooling foam was used because of cost and because this was a one time part. Materials for the filler members 21 are chosen for production with durability as a requirement as well as cost or because of ease of manufacture. Application surface 23 is formed by outer surface 25 of each tooling member and outer surface 27 of each filler member 21, which are flush. Usually, application surface 23 will be smooth and rounded, and preferably, application surface 23 will have a cylindrical shape as shown in FIG. 1.

After preparing application surface 23, a plurality of composite layers 37 (not shown in FIG. 3) are positioned on the application surface 23. Several different methods could be used to position composite layers 37 on application surface 23. The most basic method would be to hand lay the composite material. However, a major advantage of the method of the present invention is its adaptability towards automation. Although any automated technique for applying composites could be used, the most common automated techniques include filament winding, tape winding, and fiber placement.

Filament winding is a process in which a continuous filament, usually constructed of a reinforced fiber impregnated by a matrix material, is wound under tension around a rotating core. Referring to FIG. 1, mandrel 11 is rotated as the filament is applied under tension to application surface 23. Several rotations of mandrel 11 would be necessary to completely apply the filament, thus constructing the plurality of composite layers 37. The matrix material is either preimpregnated in the reinforced fiber or is applied to the fiber as the filament is being positioned on application surface 23. The matrix material serves to adhere the filament to previous layers as it is being applied, and also serves as a curing agent after formation of a final composite part.

A similar automated application technique is tape winding. A tow is a bundle of more than a thousand filaments. In a tape winding process, a unidirectional preimpregnated tape is used that consists of several tows that have been formed and spread with resin. The tape is cut to a particular width, common widths being 0.5 inch and 1.0 inch. The tape is positioned on application surface 23 as mandrel 11 is rotated about longitudinal axis 13. The tape is applied under tension, and no contact is made between the head of the winding machine and application surface 23.

The preferred application technique for the present invention is fiber placement. Unlike filament winding and tape winding, fiber placement does not use rotation of mandrel 11 to pull the composite material onto application surface 23. Instead, a fiber placement machine having a head makes contact with application surface 23 and is used to apply either a tow or a small width tape to the application surface 23. As material is placed on application surface 23, more tows or tapes are pushed to the head of the fiber placement machine. The head of the machine applies a force to the tow or tape as it is applied. The primary advantage of using fiber placement is that the directional placement of the material is not limited by the rotation of mandrel 11. Instead, material can be placed in any direction. Additionally, scrap is reduced when compared with filament winding and tape winding methods. Finally, fiber placement allows material to be easily added or removed before the material is formed into a final composite part.

After applying composite layers 37 to application surface 23, a part formation aid 39 optionally may be installed on an outer surface of composite layers 37 above each tooling member 17. Part formation aids 39, also referred to as "bat-wings," aid in the formation of a final composite part and are shaped based on the final part to be formed. In this embodiment, part formation aid 39 is generally U-shaped, having a base 40 and two outward extending sidewalls 42. The part formation aid 39 shown in FIGS. 2 and 3 is used to assist in the formation of a hat-shaped stiffener. Part formation aids 39 are sufficiently flexible to allow the sidewalls 42 to flex inward into an inverted shape to that shown in FIG. 2.

After installation of part formation aids 39, composite layers 37 are cut parallel to longitudinal axis 13 and between each tooling member 17 along slit 44 (FIG. 2). The cutting of the composite material 37 allows individual parts to be formed around each tooling member 17. Slit 44 results in a plurality of separate composite layer segments, each having side portions extending in opposite directions from each tooling member 17. For production it is recommended that the cutting operation be automated. The automation can be accomplished by attaching a cutting blade to a multiple axis end effector of the fiber placement machine or winding machine. Alternatively, fiber placement machines have an ability to stop and start material placement on the fly. Therefore, the machine could be programmed to leave a gap in the material between the segments.

Filler members 21 (not shown in FIG. 2) are then removed from mandrel 11, thus forming recesses between the tooling members 17. Mandrel 11, which still has tooling members 17, composite layers 37, and part formation aids 39 attached, is placed in a vacuum bag 45 as illustrated in FIG. 3. The vacuum bag tube 45 is placed over the mandrel with the aid of a hard outer tube. The hard outer tube is made in an appropriate shape to allow for easy fit over the mandrel 11. Vacuum bag 45 is used in conjunction with two sealing end plates 47, a vacuum fitting 49, and a vacuum line 51. After placing vacuum bag 45 over mandrel 11, the bag 45 is sealed to each end plate 47 using a typical band clamp 53. Vacuum line 51 is then connected at one end to vacuum fitting 49 and at its other end to a vacuum source (not shown).

Figure 4:
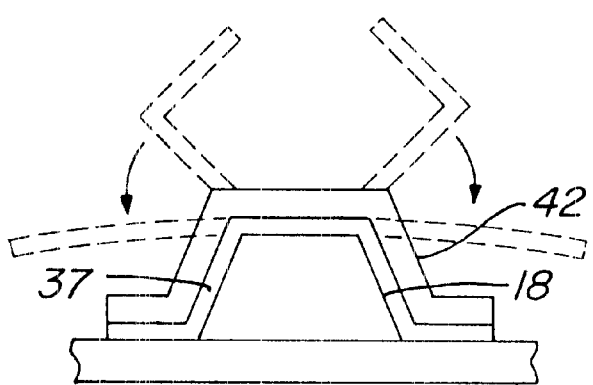
FIG. 4 is a sectional view of one of the tooling members, shown during evacuation.

The formation of a composite part using the present invention is accomplished by creating a vacuum within vacuum bag 45. After vacuum bag 45 has been sealed, the air from the bag can be evacuated through vacuum line 51 leading from a central passage in mandrel 11. The evacuation of air causes bag 45 to apply a formation force to each part formation aid 39 that is directed toward the center of mandrel 11. As the formation force is applied to each part formation aid 39, the sidewalls 42 of part formation aid 39 deform downward (toward the center of mandrel 11), thereby causing the side portions of the segments of composite layers 37 to be forced down and around tooling member 17. The folding sidewalls 42 cause side portions of composite layers 37 alongside each slit 44 to be pushed into abutment with one of the sidewalls 18, as shown in FIG. 4. Tooling members 17 define the general shape that a composite part 61 (FIG. 5) produced by the current process will become. After initial formation of the composite part, the part is held in place by vacuum bag 45 during a curing period.

Although not illustrated, the forming and curing processes described above are usually carried out inside an oven or autoclave. An autoclave allows the ambient temperature and pressure surrounding vacuum bag 45 to be raised. The exact temperature and pressure requirements for forming and curing a part depend on the resin that is used with the composite layers 37. Typically, curing takes place at elevated temperatures and pressures. Some resins actually allow the forming and curing processes to take place at room temperature and atmospheric pressure, which would negate the need for an autoclave.

Figure 5:
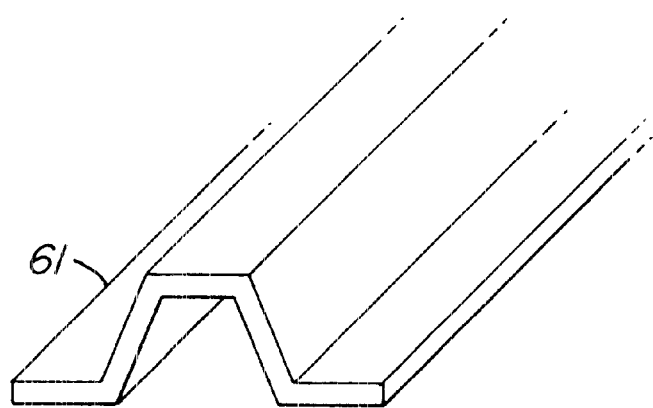
FIG. 5 is a perspective of view of a composite part formed using the method of the present invention with the mandrel and tooling members of FIG. 1.

After forming and curing, the composite part 61 (FIG. 5) is in its final shape. In FIGS. 1, 2, and 3, the shape of tooling members 17 is designed to produce hat-shape stiffener 61 as shown in FIG. 5. Stiffener 61 is commonly used with flat panels to provide added rigidity and strength to the panels. The most common application of composite stiffener 61 is in aerospace applications where strong and lightweight materials are needed.

Figure 6:
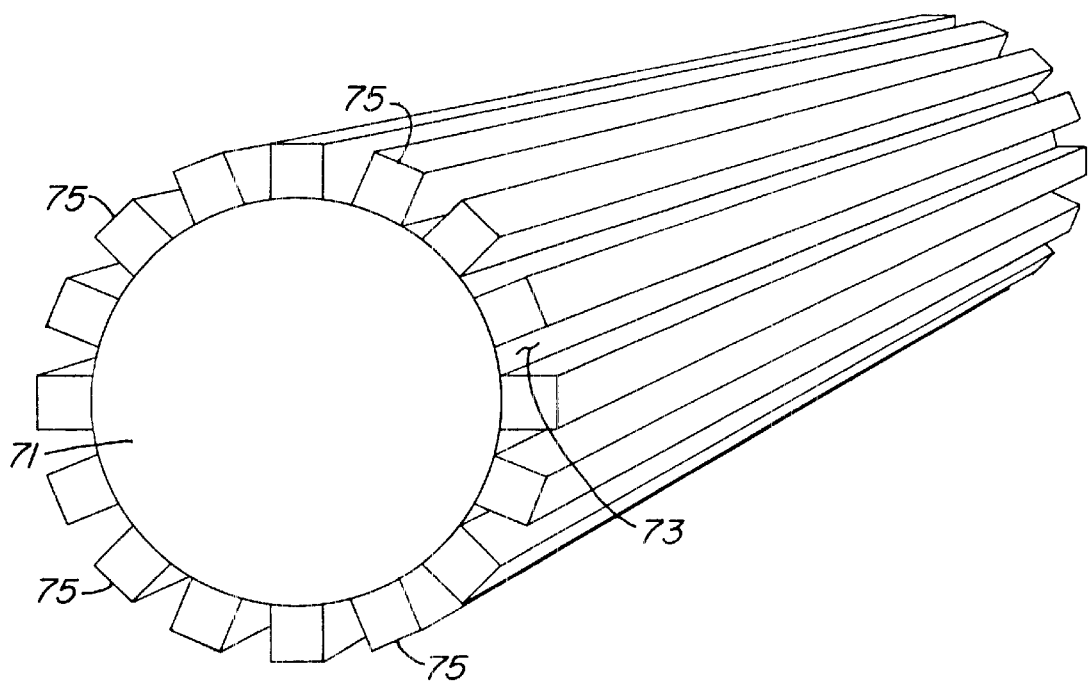
FIG. 6 is a perspective view of a mandrel having a plurality of hat-shaped tooling members for use with the method of the present invention.

Mandrel 11 is configured to produce four hat-shape stiffeners 61 per production run. Referring to FIG. 6, a mandrel 71 having a cylindrical outer surface 73 with a plurality of tooling members 75 is illustrated. Because of the large number of tooling members 75 disposed on mandrel 71, the production of stiffeners 61 would be greatly increased over the configuration provided by mandrel 11. The process described above for forming stiffeners 61 using mandrel 11 is the same process that would be used to produce stiffeners 61 using mandrel 71.

Figure 7:
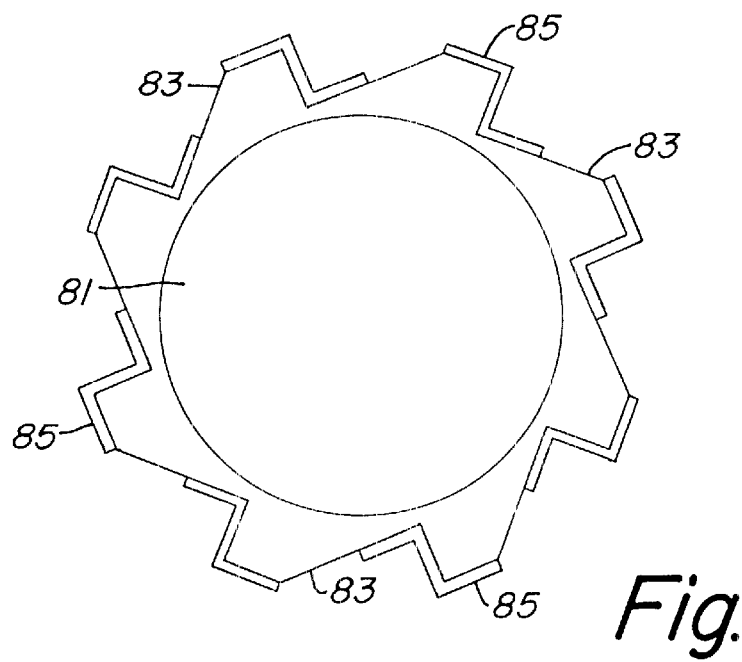
FIG. 7 is a front view of a mandrel having a plurality of Z-shaped tooling members for use with the method of the present invention.

Referring to FIG. 7, a mandrel 81 having integrally formed tooling members 83 is illustrated. The shape of tooling members 83 is such that a stiffener 85 having a Z-shaped cross section is formed using the process described above. Foam blocks (not shown) would be initially located between each tooling member 83, resulting in a cylindrical exterior. Fibers would placed over the cylindrical exterior. The foam blocks would be removed. Formation aids would bend the fibers into the shape as shown in FIG. 7. Although tooling member 83 are shown as an integral portion of mandrel 81, tooling members 83 could be separate parts that are mechanically fastened to the mandrel 81. Again, a material other than foam could be used in place of the foam blocks.

Figure 9:
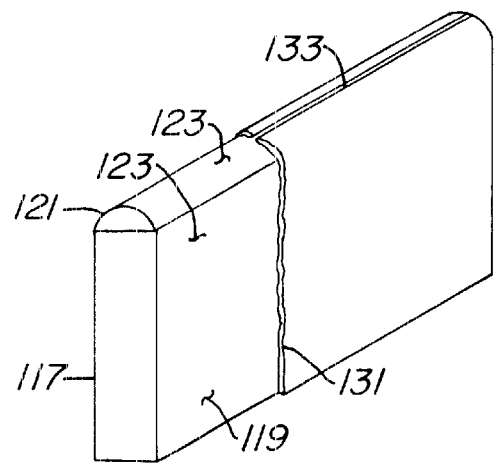
FIG. 9 is a perspective view of a plurality of composite fibers positioned on a rectangular mandrel and a filling member according to the alternate embodiment of the present invention.
Figure 10:
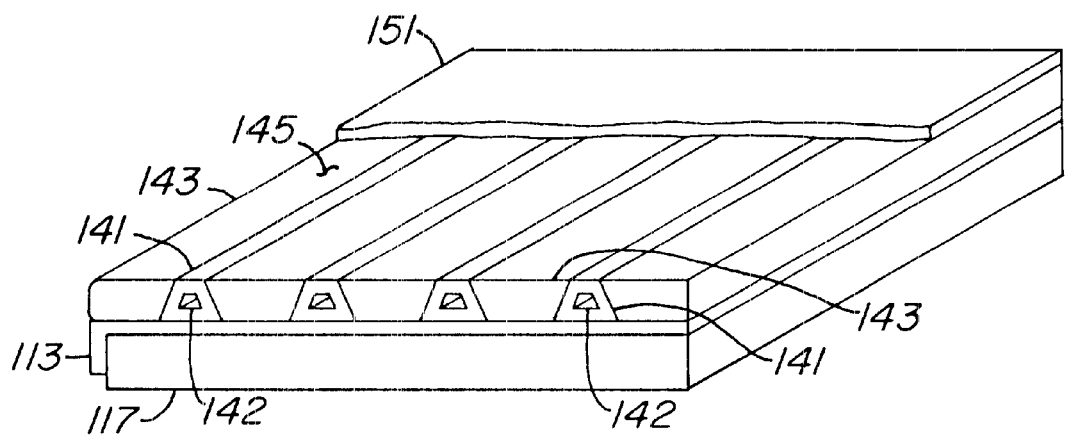
FIG. 10 is a perspective view of a plurality of composite fibers positioned on a plurality of tooling members installed on a composite part produced from the composite fibers of FIG. 9.
Figure 8:
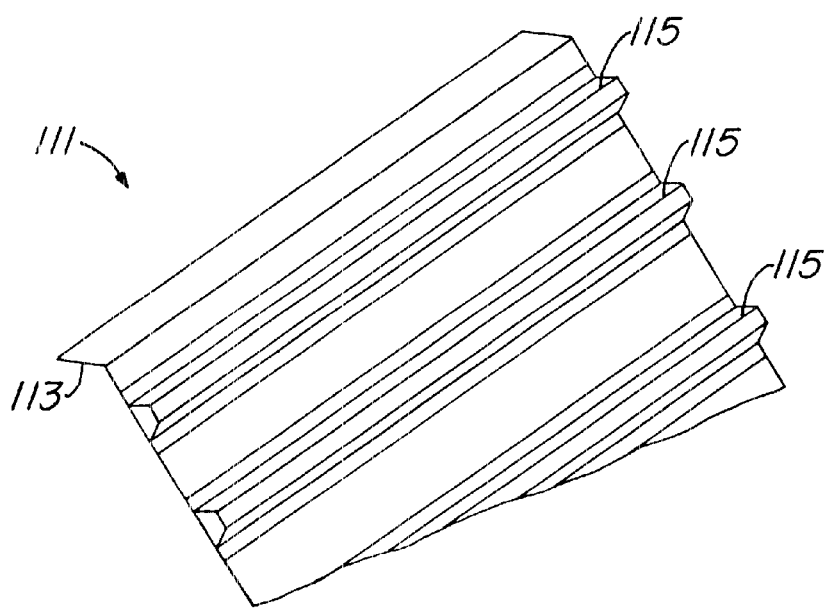
FIG. 8 is a perspective view of a composite part produced by using an alternate embodiment of the method according to the present invention.

Referring to FIGS. 8, 9 and 10, an alternate method of manufacturing composite parts according to the present invention is illustrated. A composite part 111 (FIG. 8) having a first portion, or flanged panel 113 and a plurality of second portions, or stiffeners 115 is produced, first portion 113 being co-cured to second portions 115. Composite part 111 has a flanged composite panel (first portion 113) with several hat-shaped stiffeners (second portions 115) attached to the panel.

Referring more specifically to FIG. 9, a mandrel 117 having an outer surface 119 is provided to aid in the formation of first portion 113. Although the actual shape of first portion 113 and thus the shape of the mandrel could vary depending on the application, the flanged composite panel 113 of part 111 is produced using a rectangular mandrel 117.

Before forming flanged panel 113, a filler member 121 is attached to outer surface 119 of mandrel 117 in any place needed to form a rounded or smooth corner for the formation of first portion 113. An outer surface of filler member 121 combines with outer surface 119 to form an application surface 123.

A plurality of composite layers 131 are positioned on application surface 123 using fiber placement, tape winding, filament winding, or hand-laying methods. A preferred method of applying composite layers 131 is fiber placement. Fiber placement of the composite material 131 would prevent having to wrap composite layers 131 around the entire circumference of mandrel 117. Instead the composite layers 131 can be placed wherever material is needed on application surface 123.

After applying composite material 131, the material 131 is cut along slit 133 to trim and remove any excess material. Filler member 121 is then removed from the mandrel 117. Mandrel 117 and composite material 131 is placed in a vacuum bag (not shown) as described previously. The vacuum bag is sealed and evacuated of air, causing the bag to apply a force to the composite layers 131, thereby forming the flanged composite panel 113 of composite part 111.

Depending on the curing requirements of the composite material 131 used, the evacuation process may or may not take place inside an autoclave. Regardless of whether an autoclave is used, flanged panel 113 is only to be partially cured. This allows stiffeners 115 to be co-cured to flanged panel 113.

Referring more specifically to FIG. 10, a plurality of tooling members 141, each having a center channel 142, is disposed on a surface of flanged panel 113 opposite mandrel 117. The shape of tooling members 141 determine the final shape of stiffeners 115. In FIG. 8, tooling members 141 are trapezoidal in cross-section to produce a hat-shaped stiffener similar to stiffener 61. Filler members 143 are placed on flanged panel 113 between tooling members 141 to form a smooth flat application surface 145.

A plurality of composite layers 151 are positioned on application surface 145. The preferred method of applying composite material 151 is fiber placement, although any method of positioning composites could be used. Part formation aids (not shown but similar to part formation aids 39) are placed on composite layers 151 above each tooling member 141. Composite layers 151 are cut between each tooling member 141 on a line parallel to the lengthwise axis of each tooling member 141. Filler members 143 are removed from between tooling members 141.

Stiffeners 115 are formed using the evacuation technique previously described. Mandrel 117, first portion 113, tooling members 141, composite layers 151, and the part formation aids are placed inside a vacuum bag (not shown). The vacuum bag is sealed and evacuated, thereby causing the bag to exert a force on the part formation aids. The part formation aids deform toward flanged panel 113, which causes composite layers 151 to conform to the shape of tooling members 141.

After forming stiffeners 115, both the flanged panel 113 and the stiffeners 115 are co-cured to obtain the composite part 111. Depending on the requirements of the resin used in composite layers 131, 151, the forming and curing processes will likely be performed inside an autoclave at elevated temperatures and pressures.

After forming composite part 111, tooling members 141 are removed by creating a vacuum within center channel 142. Since tooling members 141 are generally made from rubber, the tooling members 141 will compress inwardly and are easily removed from within stiffeners 115.

The scope of the alternate method described is not limited to forming a part having only a first portion and a second portion. Instead, a part having a plurality of portions may be formed by similar steps, each portion being co-cured to another in one of the final steps. Finally, it is conceivable that a similar method be used to form and attach a composite part to a preexisting composite part formed by a process outside the scope of the present invention.

One advantage of the present invention is that it provides an automated method for manufacturing composite parts using a circular array of tooling members. By providing a smooth and partially rounded application surface, composite material can be quickly and efficiently positioned by an automated positioning technique (i.e. fiber placement, tape winding, filament winding). Additionally, the circular configuration of tooling members allows rapid, large-scale production of complex composite shapes that normally require extensive manufacturing time.

Another advantage of the present invention is that it provides a method of automating the manufacture of two or more composite components that will form a final composite part. By preparing smooth application surfaces, automated composite positioning techniques can be used to create any number of different composite components. The various components can then be joined to form the final part during a co-curing or co-bonding process.

It should be apparent from the foregoing that an invention having significant advantages has been provided. While the invention is shown in only a few of its forms, it is not just limited but is susceptible to various changes and modifications without departing from the spirit thereof.

I claim:

1. A method of manufacturing a composite part, comprising:
   (a) positioning a plurality of spaced-apart tooling members on a supporting surface;
   (b) placing filler members between the tooling members, the filler members and the tooling members having flush outer surfaces such that a generally smooth application surface is formed by the outer surfaces of the tooling members and the filler members;
   (c) providing composite layer segments on the application surface;
   (d) removing the filler members, creating recesses between each of the tooling members, each of the composite layer segments having a side edge portion extending over one of the recesses;
   (e) forming the composite layer segments into the composite part's final shape by folding the side portions into the recesses into abutment with each of the tooling members; and
   (f) holding the composite layer segments in the part's final shape until sufficiently cured to maintain the part's final shape.

2. The method according to claim 1 wherein the generally smooth application surface is a cylindrical surface.

3. The method according to claim 1 wherein step (f) comprises applying heat.

4. The method according to claim 1 wherein steps (e) and (f) comprise:
   inserting the supporting surface, tooling members, and composite layer into a vacuum bag, then placing the vacuum bag into an oven and drawing a drawing a vacuum within the vacuum bag.

5. The method according to claim 1 wherein the composite layer is applied to the application surface using a fiber placement apparatus.

6. The method according to claim 1 wherein the composite layer is applied to the application surface by winding filaments of the composite layer around the application surface.

7. The method according to claim 1 wherein the supporting surface comprises a mandrel.

8. The method according to claim 1 wherein the supporting surface comprises a flat composite panel, and step (f) further comprises bonding the side edge portion of the composite layer segments to the composite panel.

9. The method according to claim 1 further comprising:
   placing a flexible part formation aid on the composite layer above the outer surface of each tooling member before step (e), the part formation aid deflecting during step (e) to physically force the side edge portions of each composite layer segment into the recess.

10. The method according to claim 1 further comprising rotating the mandrel about a longitudinal axis during step (e).

11. The method according to claim 1 wherein the composite layer is made of preimpregnated fiber.

12. A method of manufacturing composite parts, comprising:
    providing a composite first portion having an outer surface;
    attaching a plurality of tooling members to the outer surface of the first portion;
    placing filler members adjacent to the outer surface of the first portion and between the tooling members, the filler members being flush with the tooling members such that a generally smooth application surface is formed;
    providing composite layer segments on the application surface;
    removing the filler members, defining recesses, each of the composite layer segments having a side edge portion extending over one of the recesses;
    forming composite second portions into their final shape by deflecting the side edge portions into the recesses; and
    holding the second portions in the final shape until the second portions are sufficiently bonded to the first portion such that both first and second portions are joined and both first and second portions maintain their final shape.

13. The method according to claim 12 wherein the step of providing a composite first portion further comprises:
    providing a mandrel having at least one surface in the shape of the first portion to be formed;
    attaching a filler member to the mandrel to establish a generally smooth application surface for the first portion that is formed by an outer surface of the filler member and the at least one surface of the mandrel;
    applying a composite layer to the application surface;
    removing the filler member from the mandrel to create a recess and cutting the composite layer along the recess such that the composite layer has at least one edge portion extending over the recess;
    deflecting the edge portion into the recess, thereby forming the first portion into its final shape; and
    holding the first portion in the final shape until the first portion is partially cured.

14. The method according to claim 12 wherein the first portion formed comprises a panel having a flange.

15. The method according to claim 12 wherein the second portions formed comprise elongated stiffener members.

* * * * *